US008794898B2

(12) United States Patent
Suyehira et al.

(10) Patent No.: US 8,794,898 B2
(45) Date of Patent: Aug. 5, 2014

(54) TIPPING AND BALANCING HAY BALE CART (76) Inventors: Ruth Ann Suyehira, Emmett, ID (US);
Bob Suyehira, Emmett, ID (US)

( * ) Notice: Subject to any disclaimer, the term of this patent is extended or adjusted under 35 U.S.C. 154(b) by 455 days.

(21) Appl. No.: 12/983,147

(22) Filed: Dec. 31, 2010

(65) Prior Publication Data

US 2012/0003068 A1 Jan. 5, 2012

Related U.S. Application Data (60) Provisional application No. 61/291,808, filed on Dec. 31, 2009.

(51) Int. Cl.
B62B 1/06 (2006.01)

(52) U.S. Cl.
USPC .......................................... 414/452; 414/490

(58) Field of Classification Search
USPC ........... 414/495, 24.5, 24.6, 25, 26, 111, 132, 414/444, 445, 450, 453, 457, 490, 452; 294/98, 107
See application file for complete search history.

(56) References Cited

U.S. PATENT DOCUMENTS

| | | | | |
|---|---|---|---|---|
| 22,682 A * | 1/1859 | Waggoner | .................... | 56/342 |
| 80,523 A * | 7/1868 | Warnock et al. | ................ | 56/342 |
| 1,462,787 A * | 7/1923 | Degendorfer | ................. | 294/107 |
| 2,049,679 A * | 8/1936 | Whiteman et al. | ............ | 294/107 |
| 2,720,886 A * | 10/1955 | Byczek | ............................ | 135/16 |
| 2,832,634 A * | 4/1958 | Bergerson | ..................... | 294/109 |
| 2,962,177 A * | 11/1960 | Pridgeon | ........................ | 414/736 |
| 3,028,695 A * | 4/1962 | Westby | ............................ | 37/434 |
| 3,420,564 A * | 1/1969 | Jensen | .......................... | 294/87.1 |
| 3,854,609 A * | 12/1974 | Cox | ................................ | 414/732 |
| 3,901,324 A * | 8/1975 | Fisher | .............................. | 172/19 |
| 3,938,681 A * | 2/1976 | Bennett et al. | ................ | 414/739 |
| 4,069,926 A * | 1/1978 | Jackson et al. | ................ | 414/111 |
| 4,549,743 A | 10/1985 | Shimon | | |
| 4,573,846 A | 3/1986 | Willbanks et al. | | |
| 4,735,424 A * | 4/1988 | Stelter, III | ..................... | 280/43.1 |
| 5,277,439 A | 1/1994 | Pipes et al. | | |
| 5,890,754 A * | 4/1999 | Murr | .............................. | 294/107 |
| 5,975,832 A * | 11/1999 | Winkler | ........................ | 414/555 |
| 6,071,061 A * | 6/2000 | Monnin | ......................... | 414/457 |
| 6,109,856 A | 8/2000 | Mings | | |
| 6,220,811 B1 * | 4/2001 | Bernecker | ..................... | 414/555 |
| 6,364,596 B1 | 4/2002 | Spencer et al. | | |
| 6,478,526 B2 | 11/2002 | Agee et al. | | |
| 6,575,690 B1 | 6/2003 | Ansotegui | | |
| 2002/0187021 A1 | 12/2002 | Drost | | |
| 2003/0194303 A1 | 10/2003 | Lunger | | |
| 2008/0100012 A1 | 5/2008 | Randall | | |

* cited by examiner

*Primary Examiner* — Saul Rodriguez
*Assistant Examiner* — Glenn Myers
(74) *Attorney, Agent, or Firm* — Pedersen and Company, PLLC; Ken J. Pedersen; Barbara S. Pedersen (57) ABSTRACT A hand-operated hay bale cart has only two wheels connected in a laterally spaced-apart fashion to a generally rectangular handle frame. The handle frame is generally near the top, or above, the wheels, creating an open space beneath the frame and between the wheels for receiving a bale of animal feed. Pivotally supported by the handle frame is a securement rack that swings freely on a horizontal axis and includes a set of curved hooks at or near both the front and back of the securement rack. A hook handle operates the hooks to rotate relative to the rack to impale the hay bale. The securement rack, if it is allowed to rotate freely, including when it has impaled and secured a bale of hay, may balance the lifted bale of hay between the two wheels for convenient transport.

14 Claims, 14 Drawing Sheets

TIPPING AND BALANCING HAY BALE CART

This application claims benefit of U.S. Provisional Application Ser. No. 61/291,808, filed Dec. 31, 2009, the disclosure of which is incorporated herein by this reference.

BACKGROUND OF THE INVENTION

1. Field of the Invention

This invention relates generally to handcarts for lifting and transporting bales of hay. More specifically, this invention relates to a hand-operated hay bale cart with only two wheels connected to a handle frame, which frame pivotally supports a securement rack that impales a hay bale, and balances the impaled hay bale when lifted.

2. Related Art

There are several prior art handcarts for lifting and transporting bales of hay. Also, there are several prior art hand hay bale carts with only two wheels. However, to applicants' knowledge, there has not yet been disclosed a hand hay bale cart with only two wheels connected to a handle frame, which frame pivotally supports a securement rack that impales a hay bale, and balances the impaled hay bale when lifted.

SUMMARY OF THE INVENTION

According to the present invention, a hand-operated hay bale cart is provided with only two wheels, the wheels being connected in a laterally spaced-apart fashion to a generally rectangular handle frame. The handle frame is connected to the two wheels by a set of two generally downwardly depending wheel supports, one on each side of the frame. This way, the handle frame exists generally near the top, or above, the wheels. Also, this way there is created an open space beneath the frame and between the wheels for receiving a bale of hay.

Pivotally connected to and supported by the handle frame is a securement rack for impaling and balancing a hay bale between the two wheels. The securement rack is preferably also a generally rectangular, horizontal frame pivotally connected to near the front of the handle frame. The securement rack swings freely on a horizontal axis, when suspended from near the front of the handle frame. Near both the front and back of the securement rack is a set of curved hooks that rotate relative to the securement rack frame. The front and back hook sets are connected by a rod so that they operate together. The rod is connected to a hook handle, which is operated to impale the hay bale for lifting or to withdraw from the hay bale for releasing it. This way, the securement rack rotates around a horizontal axis near the front of the handle frame. Also this way, the securement rack, if it is allowed to rotate freely, including when it has impaled and secured a bale of hay, may balance the lifted bale of hay for convenient transport of it.

Near the back of the handle frame is a handle for being grabbed and worked by the hay bale cart operator. For operation, the cart is pushed above and around a single hay bale on the ground. Then, the securement rack is actuated to impale the hay bale. Preferably, the cart operator first places the securement rack centrally along the length of the bale, and then actuates the securement mechanism. Preferably, the securement mechanism is two sets of pairs (total of 4) of rotatable curved hooks, one set being proximal and one set being distal, which are both simultaneously rotated forward and down into the hay bale, in order to impale and secure it. The simultaneous action of the hooks is effected by a common linkage to a hook handle, which the bale cart operator pulls rearward to rotate the hooks down, and impale the bale with the hooks.

Then, the operator tips the handle frame back and down to lift the impaled bale. Then, the lifted impaled bale rotates by gravity with the securement frame to arrive at a generally level, suspended lifted state for easy transport by the operator pushing forward or pulling backward on the handle frame.

DETAILED DESCRIPTION OF THE PREFERRED EMBODIMENT OF THE INVENTION

Referring to the Figures, there is depicted one, but not the only, embodiment of the present invention.

The hay bale cart 10 has only 2 wheels 12 and 12'. The wheels are each connected in conventional fashion to one of two generally downwardly-depending wheel supports 14 and 14', respectively, the wheel supports depending in spaced-apart relation from generally rectangular handle frame 16. Handle frame 16 has a rectangular main body 17, and handle 18 for being grasped by an operator of the instant hay bale cart. One may see in the drawings that the preferred main body 17 and wheel supports 14, 14' place the main body 17 so that it lies on a plane at or above the uppermost surfaces of the wheels. Front cross bar 20 may be considered part of the rectangular main body 17, thus, forming the fourth side of main body 17. Alternatively, the main body 17 may be considered the rear and two side bars/members, wherein the side bars/members are connected at 90 degrees to each other, in which case the front cross bar 20 would be an additional member closing the rectangle. Pivotally suspended from front cross bar 20 near the front of handle frame 16 is generally rectangular, horizontal securement rack 22. Rack 22 has two cross bar collars 24 and 24', both of which fit freely over frame front cross bar 20, and are constrained between collar stop sets 26 and 26' (see FIG. 17).

Figure 17:
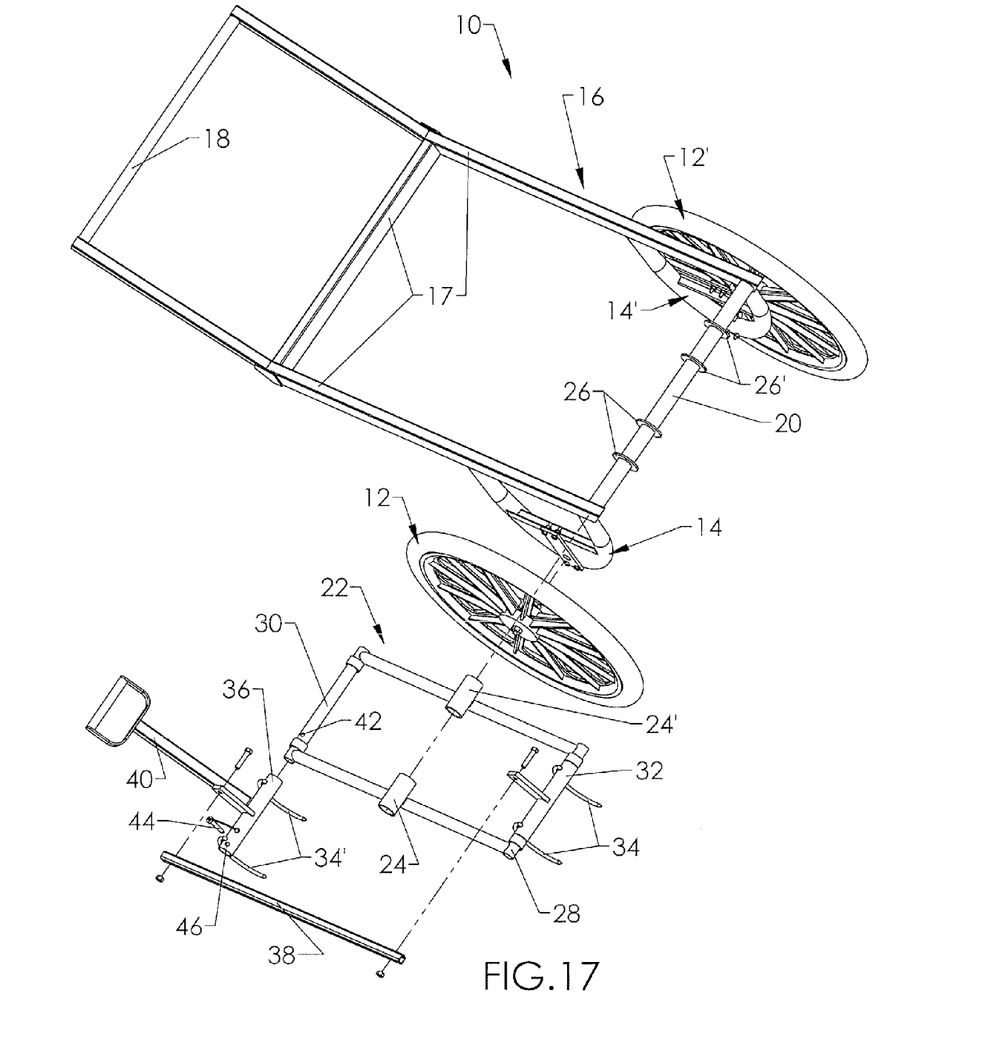
FIG. 17 is an exploded view of the embodiment depicted in FIG. 1.

As may be seen to best advantage the exploded view of FIG. 17, securement rack 22 has a rack front end 28 and a rack back end 30. Around rack front end 28 rotates front hook collar 32 with attached front, forwardly pointed curved hooks 34. Around rack back end 30 rotates back hook collar 36, also with attached back, forwardly pointed curved hooks 34'. Front hook collar 32 and back hook collar 36 are connected by linkage rod 38. Also, connected to back hook collar 36 is hook handle 40. Optionally, in rack back end 30 is a hole 42 for receiving locking pin 44, which is tethered for convenience to back hook collar 36. Locking pin 44 may be inserted through passageway 46 in back hook collar 36, and into hole 42 in rack back end 30, to lock the moveable hook system relative to the securement rack 22 in the engaged/actuated position, wherein the hay bale is secured to the cart. Alternatively, other locks or retainers may be used to retain the securement rack 22 in the engaged/actuated position, for example, an elastic cord 50 or other cords or ties. Also, the elastic cord or other cords or ties may be used to retain the securement rack 22 in a desired position even when the cart 10 is not carrying a bale.

The hay bale cart of the instant invention may be conveniently made from conventional materials by conventional techniques. Preferably, the handle frame, wheel supports, securement rack, hooks and hook handle are made of metal. The wheels may be conventional bicycle wheels or wheel chair wheels, for example. The current preferred wheel is 20 inches in diameter. The wheels may be different styles and sizes compared to those shown in the drawings, for example, different diameters and/or different hub and wheel styles, wherein the wheel supports 14, 14' may be adapted for the different wheels if necessary. Alternatively, the bars/members making up the handle frame and other members of the cart may be of other metal stock compared to those shown in the drawings. For example, the members of the handles 18 and 40 may be shaped/formed differently, for example, for ergonomic or economy reasons. No special suspension or brake system is required, however, they may be optionally provided. The instant hay bale cart is intended primarily for hand operation, however, the securement rack may be motorized by conventional means for actuation into and out from the bale. Also, the wheels may be motorized by conventional means for propulsion.

Alternatively, the securement rack may comprise a clamping mechanism instead of the hook impaling system. The clamping mechanism may operate on both sides, or the front and back, of the bale to be lifted. Or, the securement rack may comprise a different type of lifting mechanism, like a set of forks on a forklift. The forks may be run under the bale, for example, and moved up to clamp the bale between them and the top of the securement rack.

Figure 1:
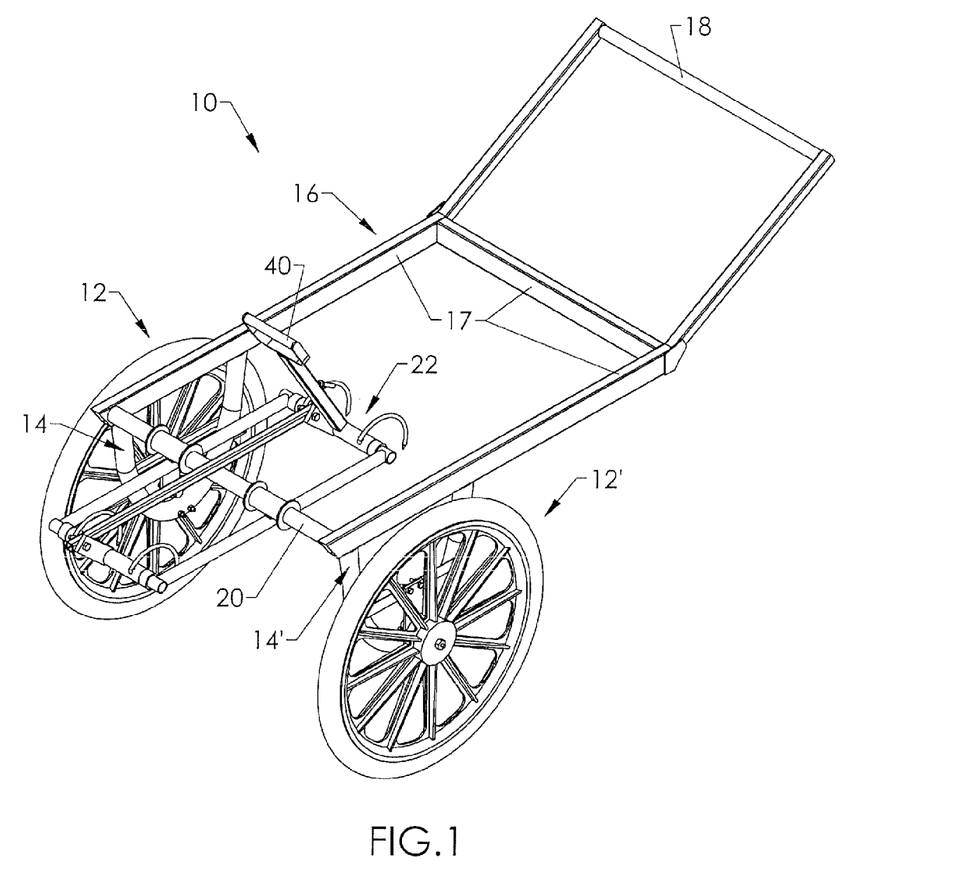
FIG. 1 is a front, top, perspective view of one embodiment of the bale cart invention, with the main body of the handle frame being horizontal for carrying a bale, resulting in the handle portion of the handle frame extending about 45 degrees upward from horizontal.
Figure 2:
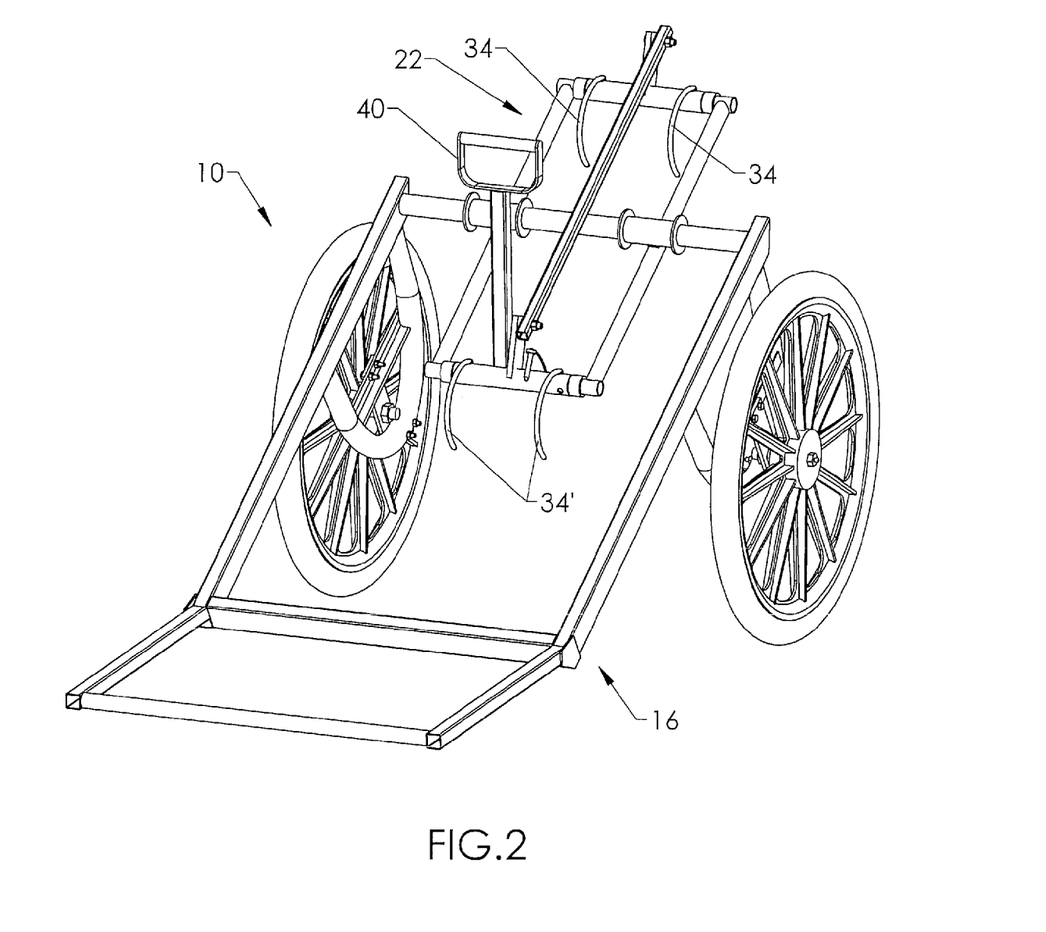
FIG. 2 is a rear, top, perspective view of the embodiment of FIG. 1, but with the handle frame in a lowered position, for example, lowered to the ground, as one way of parking the instant cart.
Figure 3:
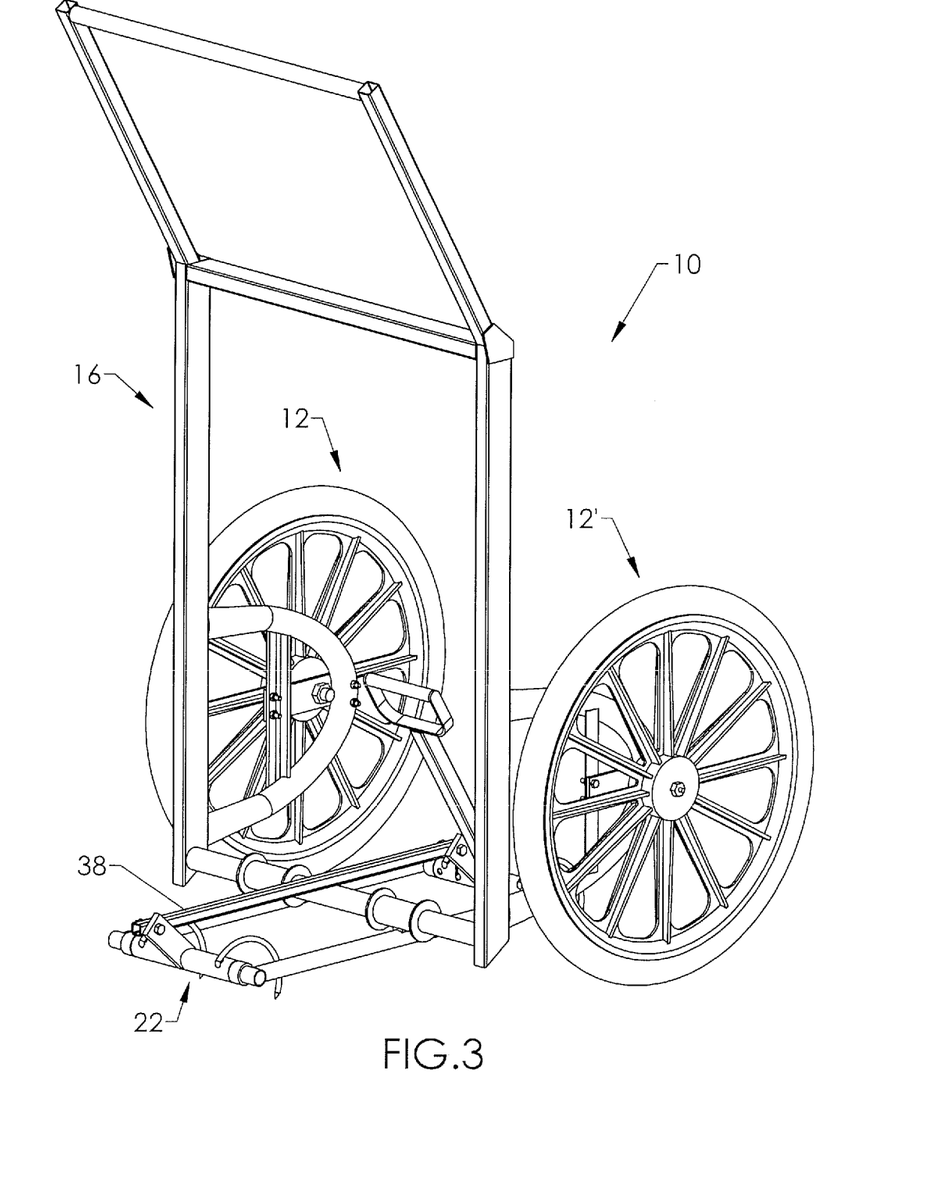
FIG. 3 is a perspective view of the embodiment depicted in FIG. 1, wherein the bale cart is tipped forward to place the handle frame generally vertical, and the securement rack has pivoted to remain generally parallel to the ground, as another way of parking the cart.
Figure 4:
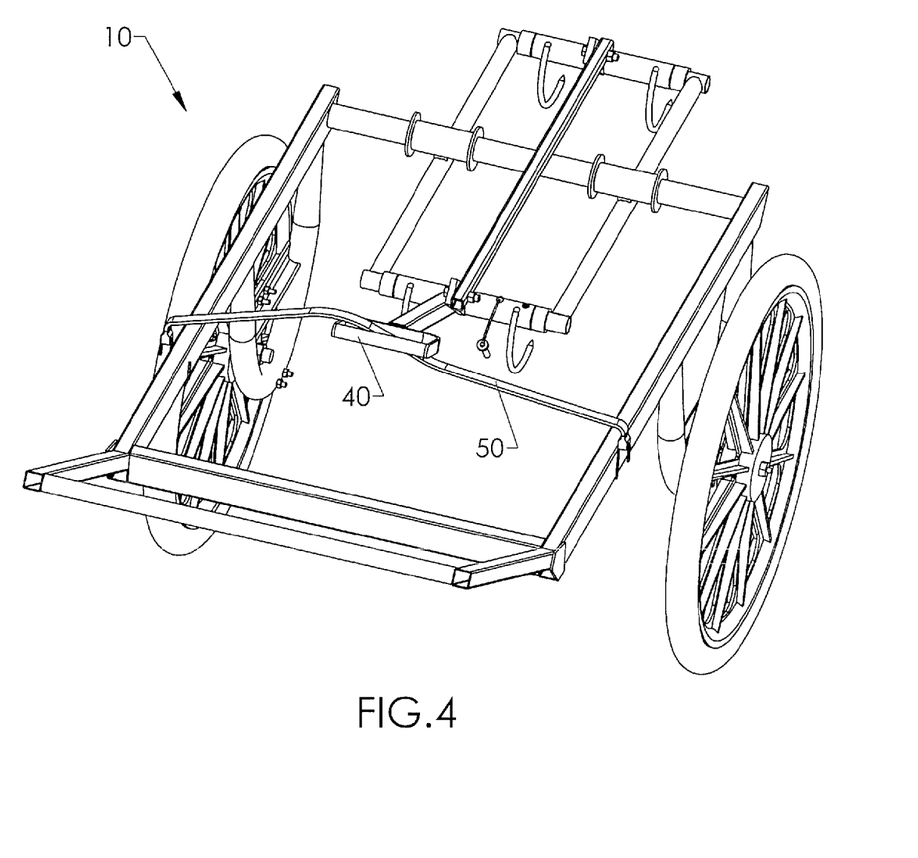
FIG. 4 is a top, rear perspective view of the embodiment of FIG. 1, wherein the securement rack has been actuated, and the securement rack is temporarily restrained in the actuated position with an elastic cord.
Figure 5:
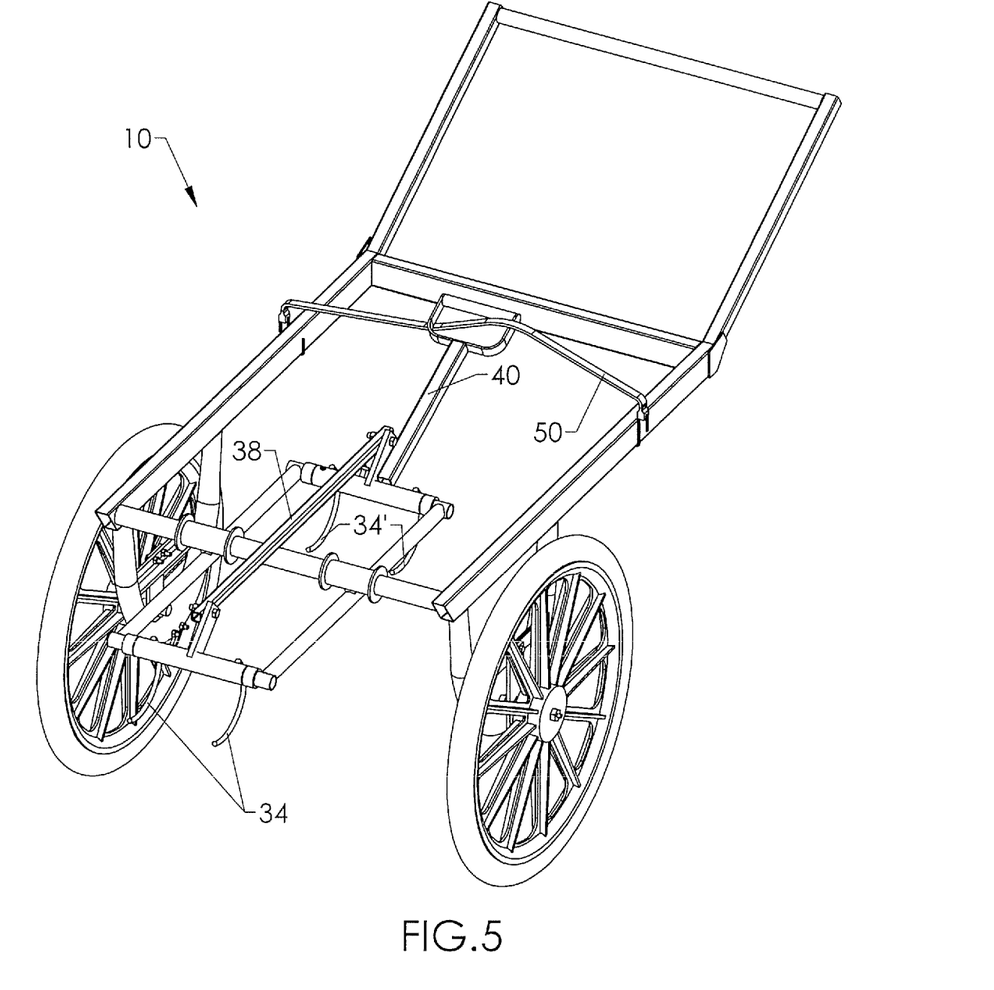
FIG. 5 is a top, front perspective view of the embodiment of FIG. 1, with the securement rack actuated and temporarily restrained as in FIG. 4.
Figure 6:
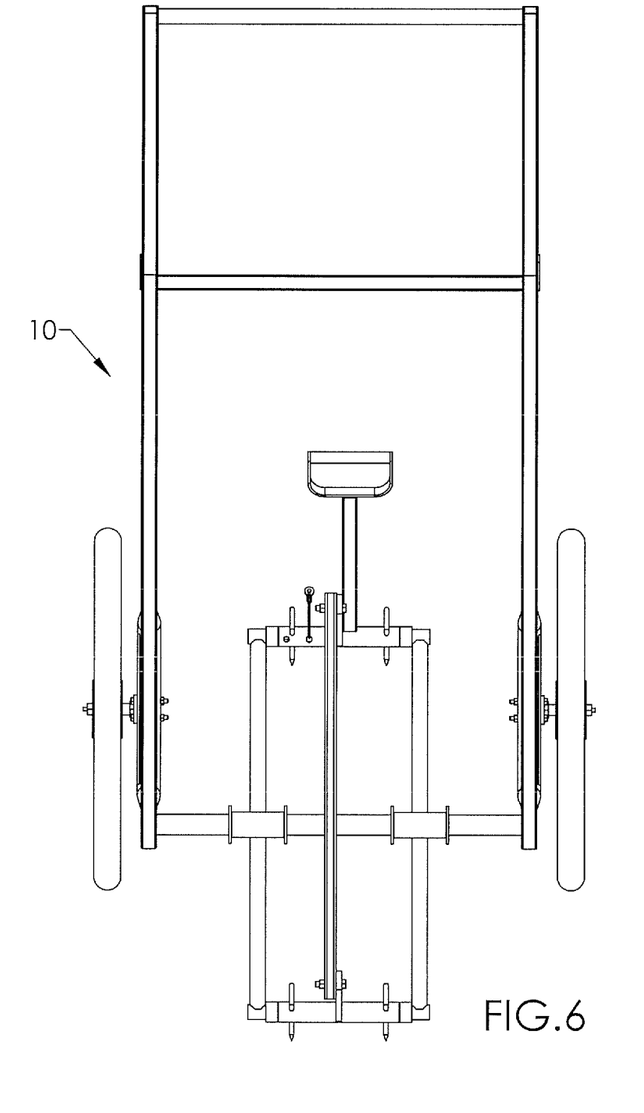
FIG. 6 is a top view of the embodiment of FIG. 1, with the securement rack handle pulled rearwards to actuate the securement rack hooks.

Referring specifically to the drawings to show the preferred methods of using the cart 10, one may see the cart in an unengaged position in FIGS. 1-3 and 7. The cart, in this position, may be easily rolled over many types of terrain and surfaces, including farm yards, corrals, gravel and dirt paths, concrete paths and platforms, and other rough or smooth terrain and surfaces. In FIGS. 2 and 3, the cart is shown in a resting position, for example, tipped partially rearward (FIG. 2) or tipped all the way forward (FIG. 3), to rest the cart on part of its handle frame. The freely-pivoting securement rack is shown to good advantage in FIG. 3, wherein it has pivoted during the forward-tipping to rest on or near the ground in a position substantially or entirely parallel to the ground, even through the handle frame is substantially vertical.

The cart is shown in FIGS. 4-6, 9, and 11-15, in a configuration wherein the securement rack handle has been pulled rearward to pivot the hooks into an engaged position. The preferred hooks 34, 34' may be described as each curving generally or roughly along a circumference of a circle, to extend around said circumference at least 180 degrees, and preferably in the range of 170-220 degrees. The hooks need not curve on only a single radius but may curve on different radii. However, the generally circular curvature, on generally the same radius, is preferred as it allow the hooks to pivot smoothly into the hay bale upon rotation of the front and back hook collars 32 and 36. While it is preferred that two sets of hooks, each set comprising two hooks, be used, some less-preferred embodiments may use a single hook at or near the front and a single hook at or near the rear of the rack, with said single hooks being at or near the longitudinal centerline of the rack, to impale the bale at or near the longitudinal centerline of the bale. Therefore, it may be said that the cart comprises at least two hooks for impaling the bale, and it may be said that the cart comprises at least one front hook at or near the front end of the rack and at least one rear hook at or near the rear end of the rack.

Figure 7:
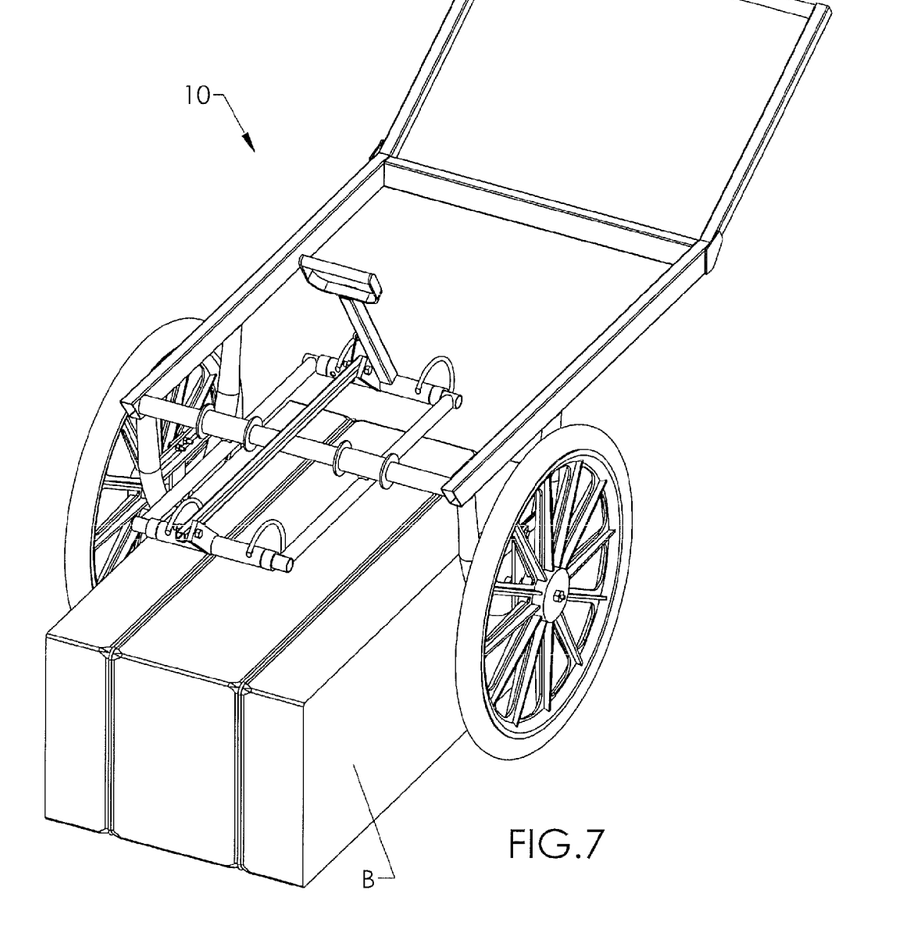
FIG. 7 is a top, front-left perspective view of the embodiment of FIG. 1, with the hay bale cart rolled over a bale of hay and the securement rack not yet actuated.
Figure 8:
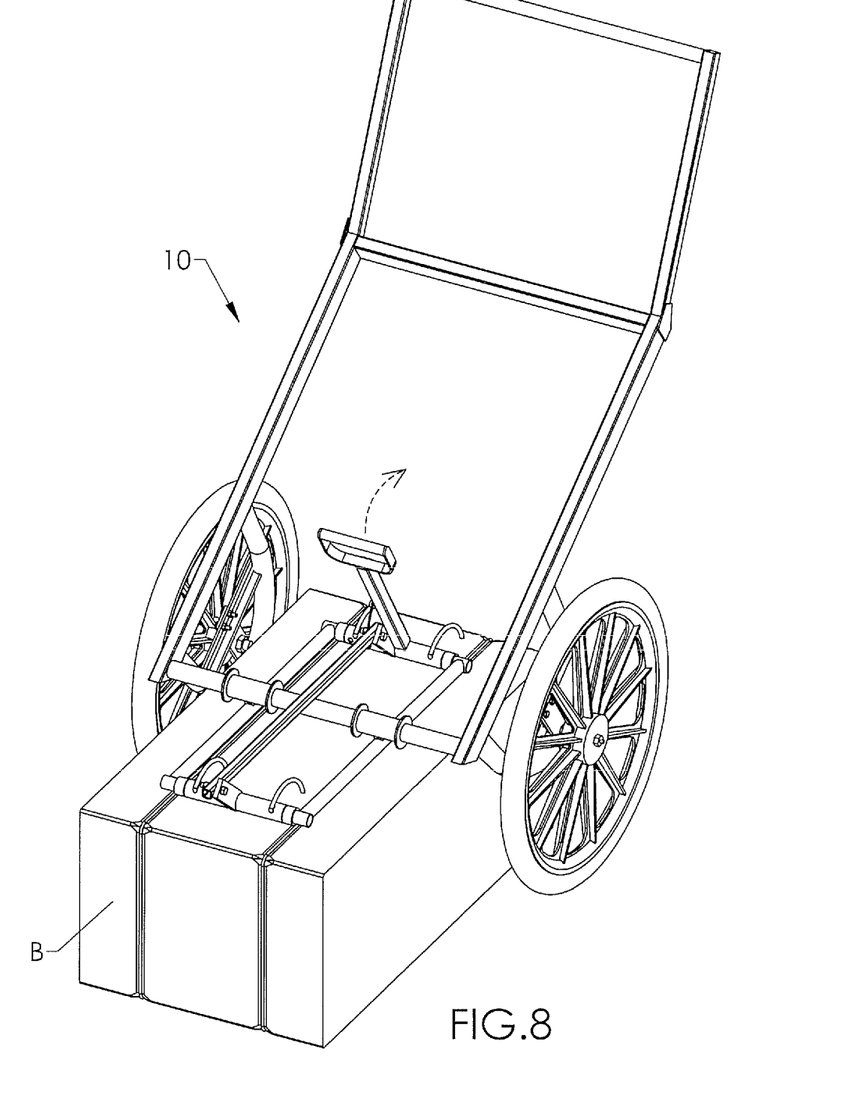
FIG. 8 is a view like FIG. 7, but with the handle frame being lifted up and rearward to lower the securement rack hooks for impaling the bale of hay.
Figures 9, 10:
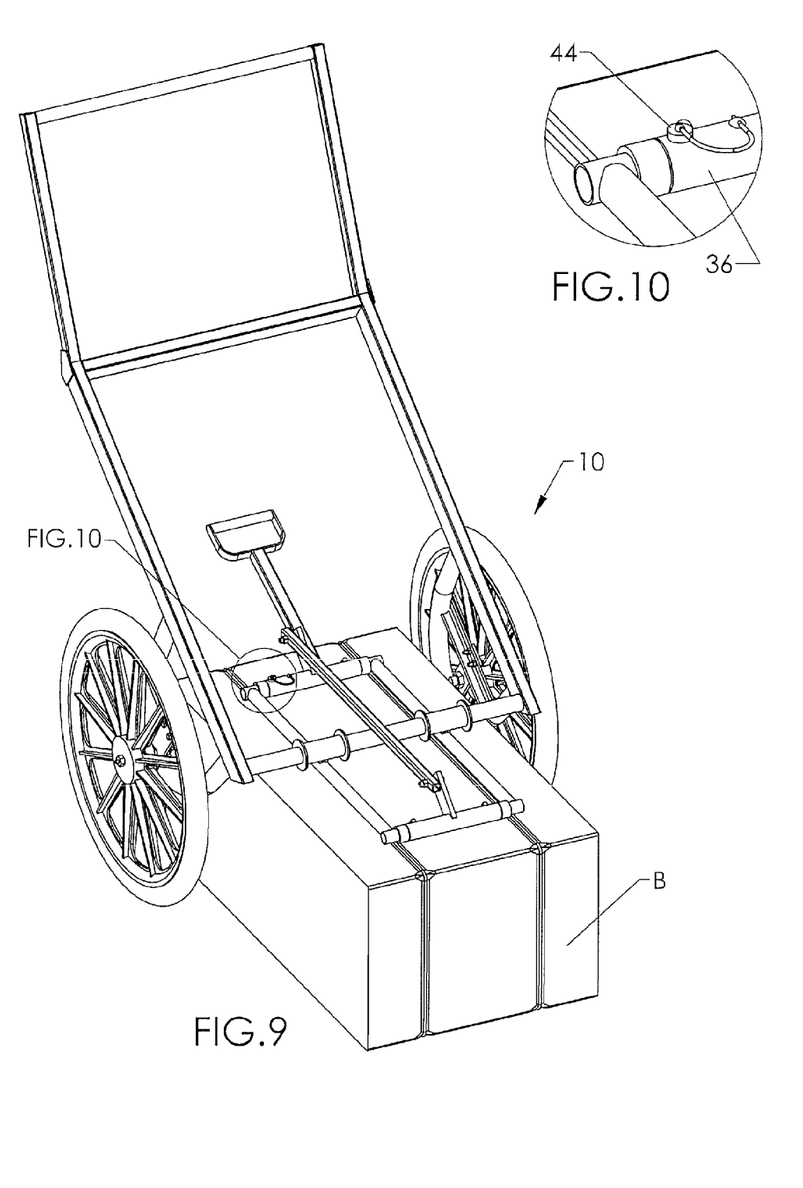
FIG. 9 is a top, front-right perspective view of the embodiment of FIG. 1, with the hook handle actuated to impale the bale with the hooks.
FIG. 10 is a partial, detail view of the circled portion of FIG. 9, with a lock pin inserted in the securement mechanism to prevent it from moving and releasing the impaled bale.
Figure 11:
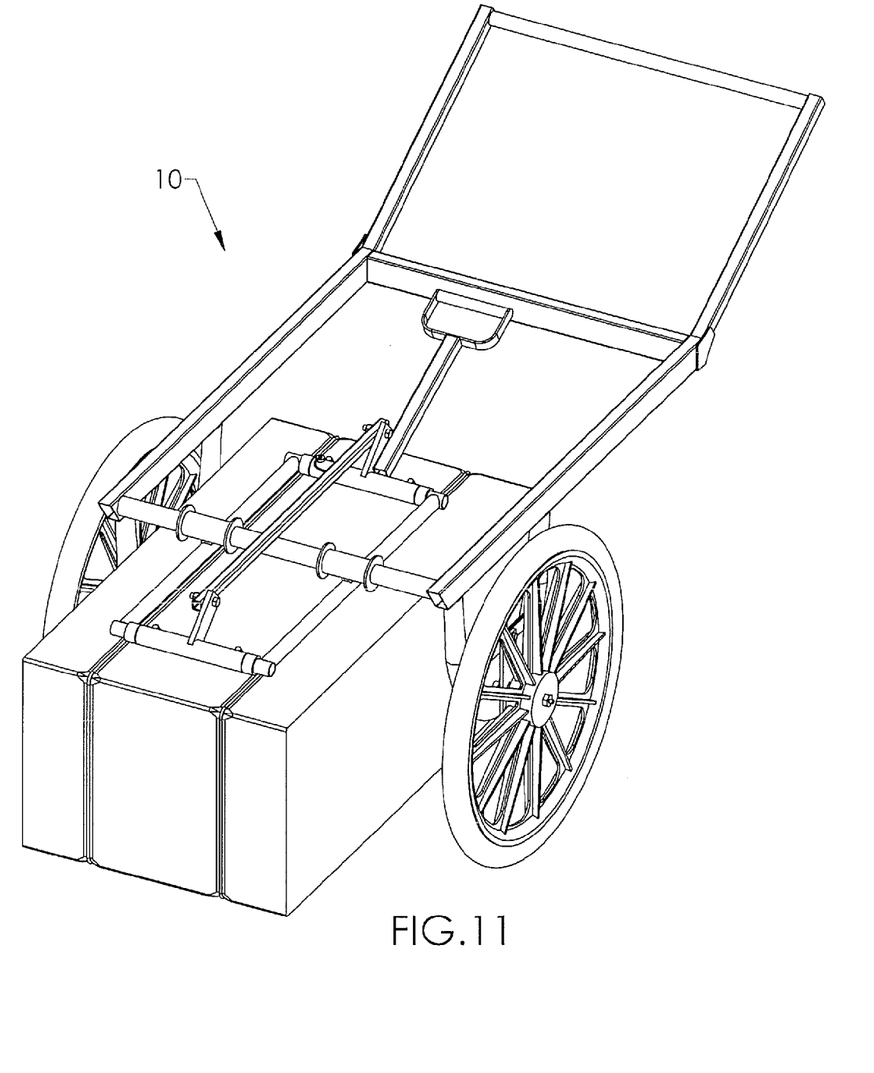
FIG. 11 is a top, front-left perspective view of the embodiment of FIG. 1, with the hook handle actuated to impale the bale with the hooks.
Figure 12:
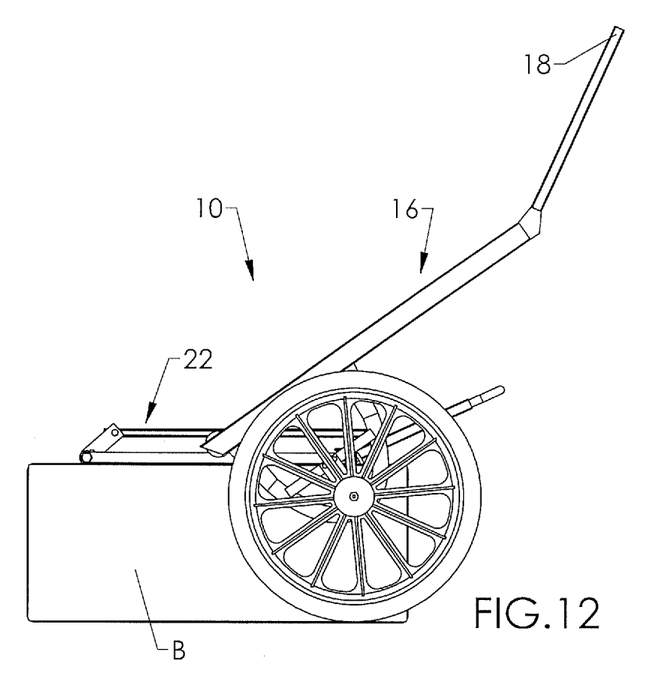
FIG. 12 is a left side view of the embodiment depicted in FIG. 1, with the handle frame raised, and an impaled bale of hay ready to be lifted.

FIGS. 7-9 and 11-15 show to best advantage the interaction and use of the cart 10 with a single hay bale B. One may describe a typical bale as a rectangular-prism-shape, with the bale top surface and bale bottom surface being perpendicular to the two side and two end surfaces, with the two side surfaces being parallel to each other and the two end surfaces being parallel to each other. In FIG. 7, the cart 10 has been wheeled over the bale B. In FIGS. 8-12, one may see the actuation of the handle of the securement rack 22, with the handle frame 16 tipped forward until the main body 17 is about 45 degrees to the ground (typically 35-55 degrees). This position allows the securement rack to be lowered to the top of the bale B so that, when the handle 40 is pulled rearward, the hooks 34, 34' are forced to slide/rotate downwardly and in the forward direction into the bale B. This tilted handle frame and engaged securement rack configuration is best seen in FIG. 12, wherein the bale is still lying on the ground, with the securement rack resting on the top surface of the bale, and the bale gripped by the two sets of hooks 34, 34'.

Figure 13:
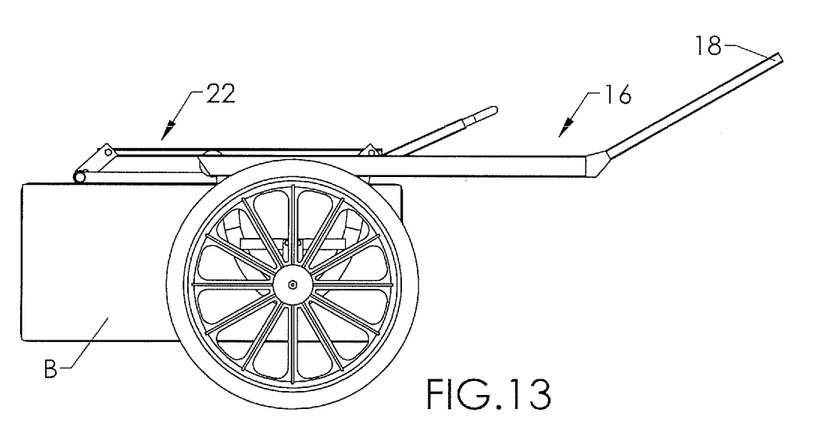
FIG. 13 is a left side view as in FIG. 12, but with the handle frame pivoted to place the main body of the handle frame level (horizontal), to lift the impaled bale of hay up above the ground for transport.
Figure 14:
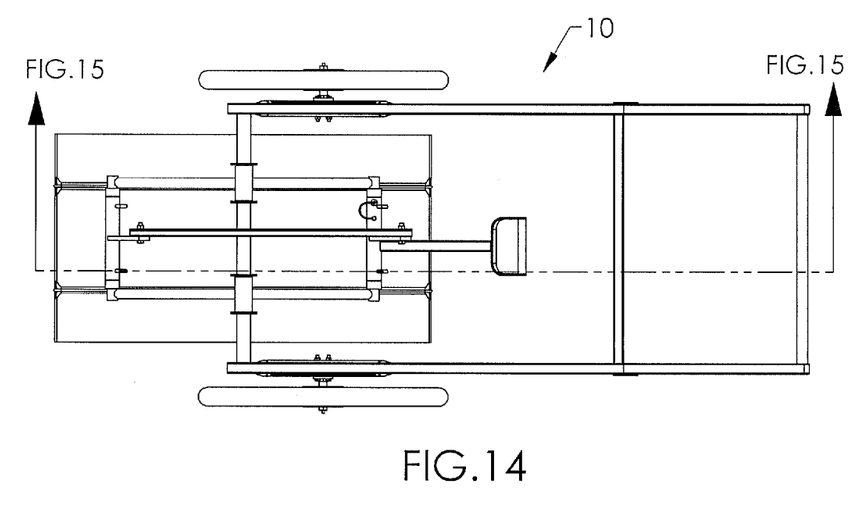
FIG. 14 is a top view of the view depicted in FIG. 13.
Figure 15:
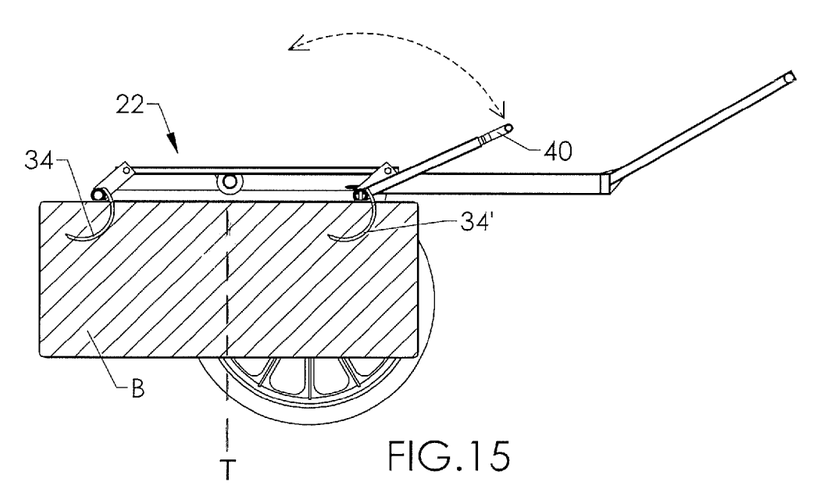
FIG. 15 is a left side, cross-sectional view taken along the line 15-15 in FIG. 14.
Figure 16:
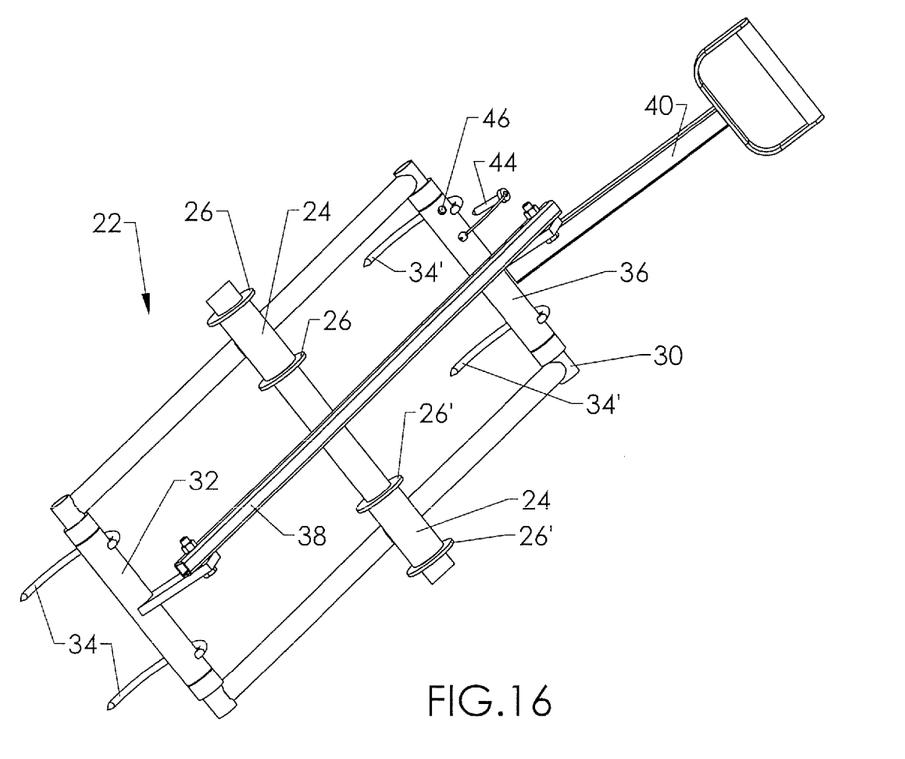
FIG. 16 is a top, perspective, detail view of the securement rack of the preferred embodiment of the present invention.

Then, once the securement rack is preferably secured by locking pin 44, the cart 10 is tipped rearward again, as shown in FIG. 13, to lift the bale B off the ground. In this lifted position, the longitudinal axis of the bale, and the bottom and top surfaces of the bale, are parallel or generally parallel to the ground. Note that this is possible because of the freely-pivoting securement rack 22 and the balancing of the bale underneath the rack 22.

This balancing is accomplished at least in part because the bale is preferably gripped tightly to the underside of the pivotal securement rack 22, wherein the hooks are preferably fully inserted into the bale with the front and rear sets of hooks being the same or about the same distance from the front edge and rear edge, respectively, of the bale. Note in FIG. 15 that the front and rear hooks enter and curve around inside the bale at about the same distance from the front and rear surfaces/edges of the bale, respectively. The center of gravity of the bale is thus generally under the middle of the securement rack, preferably directly underneath the pivot axle of the securement rack, and the bale is captured, lifted, and balanced in the cart. There is some leeway in where the hooks should enter the bale, and some variation in where the center of gravity of the bale is relative to its end surfaces; even with this leeway and variation, the cart 10 will still be able to generally balance the bale underneath the handle frame, between the wheels, and above the ground. Preferably, the hooks impale the bale B near the front and rear of the bale, for example, at least half of the way from the transverse center plane T to the respective end surface of the bale. Also, as the hooks are in front and rear sets, the right and left hook of each set are laterally-spaced apart, and impale the bale to the right and to the left of the longitudinal centerline of the bale, preferably at locations 30-60% of the way from the longitudinal centerline to the side surfaces of the bale.

When the bale is lifted, the main body 17 of the handle frame is parallel or about parallel to the ground, and the handle 18 (which extends from the main body 17 at about 40 degrees (typically 30-50 degrees) is about 40 degrees (typically 30-50 degrees) from the plane of the ground, making it easy for a user to reach and push or pull, for transport of the bale.

Because the cart 10 may tip forward and the securement rack 22 pivots relative to the hand frame 16, bales of various heights may be captured and lifted. Also, adaptations may be made in the wheel supports 14 to allow adjustment for various heights of bales.

From this description and the drawings, one may understand that the bale may be easily placed and released after wheeling the cart 10 to a desired location. The cart 10 may be tipped slightly forward to place the bale on the ground, still gripped by the engaged hooks of the pivoting securement rack. Then, the preferred pin 44 is withdrawn, and the handle 40 is pushed forward, to rotate the hooks in the opposite direction, up and out of the bale B. Thus, the bale then rests on the ground or other surface, and the disengaged cart may be wheeled away, for example, for storage or to carry another bale.

Thus, the cart is a convenient and economical device for carrying individual bales around a farm, yard; barn, or other environment. It is especially beneficial for those having small or medium-sized livestock-feeding operations, including for 4-H clubs, smaller and medium farms, hobbyists, and other people who feed animals with hay or other baled feed, but do not want to incur the expense of heavy equipment and/or do not have the strength to lift a hay bale without an assisting device.

Although this invention has been described above with reference to particular means, materials and embodiments, it is to be understood that the invention is not limited to these disclosed particulars, but extends instead to all equivalents within the broad scope of the following claims.

The invention claimed is:

1. A bale-carrying cart comprising:
   a frame having a generally rectangular front portion and a rearwardly-extending handle portion, the front portion having a horizontal axle near its front end;
   wheels supporting the frame above the ground;
   a securement rack pivotally connected to the horizontal axle on the front portion of the frame, the rack comprising a front set of hooks and a rear set of hooks, said front and rear sets of hooks being curved, pointed in the forward direction, and pivotal on said securement rack; and
   a handle system connected to said front and rear sets of hooks to actuate the sets of hooks to rotate downwardly and in the forward direction for impaling a bale of feed;
   wherein said securement rack comprises a rectangular rack frame with front member, rear member, two side members, a front rotating collar encircling said front member to which said front set of hooks is fixed, a rear rotating collar encircling said rear member to which said rear set of hooks is fixed, and a linking rod between said front rotating collar and said rear rotating collar, wherein said handle system comprises a rack-handle extending from the rear rotating collar, so that pulling the rack-handle rotates both the front rotating collar and the rear rotating collar for rotating the sets of hooks to impale a bale.

2. A bale-carrying cart as in claim 1, wherein the wheels consist of only two wheels being connected to the frame in laterally spaced-apart positions under the frame.

3. A bale-carrying cart as in claim 1, wherein the securement rack is freely-pivotal on said horizontal axle and said front set of hooks is spaced forward of said horizontal axle and said rear set of hooks is spaced rearward of said horizontal axle.

4. A bale-carrying cart as in claim 1, wherein the frame is at or above the tops of the wheels.

5. A bale-carrying cart as in claim 1, wherein the rearwardly-extending handle portion of the frame extends rearward from the front portion of the frame at an angle in the range of 30-50 degrees.

6. A bale-carrying cart as in claim 1, wherein each hook of said sets of hooks curves on a radius of at least 180 degrees.

7. A bale-carrying cart as in claim 1, wherein each hook of said sets of hooks curves on a radius in the range of 170-220 degrees.

8. A cart as in claim 1, wherein each of at least one front hook and at least one rear hook curves an amount in the range of 170-220 degrees.

9. A cart for carrying a rectangular-prism-shaped bale, the cart comprising:
   a frame having a generally rectangular main body having a front and a rear and a rearwardly-extending handle, the main body being supported up off the ground by two wheels laterally-spaced-apart to be located at a right side and a left side of the main body;
   a rack freely rotating around a horizontal axle at or near the front of the main body, the rack comprising a generally rectangular rack frame with at least one front hook at or near a front end of the rack, and at least one rear hook at or near a rear end of the rack, said at least one front hook and at least one rear hook being curved, pointed in a forward direction, and pivotal on said rack to impale the bale received below the frame and between the wheels; and a rack-handle connected to said at least one front hook and said at least one rear hook to actuate the hooks to rotate downwardly and in the forward direction for impaling the bale;

wherein said generally rectangular rack frame comprises a front member, rear member, two side members, a front rotating collar encircling said front member to which said at least one front hook is fixed, a rear rotating collar encircling said rear member to which said at least one rear hook is fixed, and a linking rod between said front rotating collar and said rear rotating collar, wherein said rack-handle extends from the rear rotating collar, so that pulling the rack-handle rotates both the front rotating collar and the rear rotating collar for rotating the at least one front hook and at least one rear hook at the same time to impale a top surface of the bale.

10. A cart as in claim 9, wherein the wheels consist of only two wheels being connected to the frame in laterally spaced-apart positions under the frame.

11. A bale-carrying cart as in claim 9, wherein the rack is freely-pivotal on said horizontal axle and said rack is pivotal to remain in a horizontal position when the cart is tipped forward to place the frame in a generally horizontal position.

12. A cart as in claim 9, wherein the frame is at or above the uppermost surface of the wheels.

13. A cart as in claim 9, wherein the handle of the frame extends rearward from the main body of the frame at an angle in the range of 30-50 degrees.

14. A cart as in claim 9, wherein each of at least one front hook and at least one rear hook curves at least 180 degrees.

* * * * *